Jan. 16, 1968   R. GOTTSCHALD   3,363,921
UNIVERSAL JOINTS, ESPECIALLY FOR MOTOR VEHICLES
Filed June 22, 1965
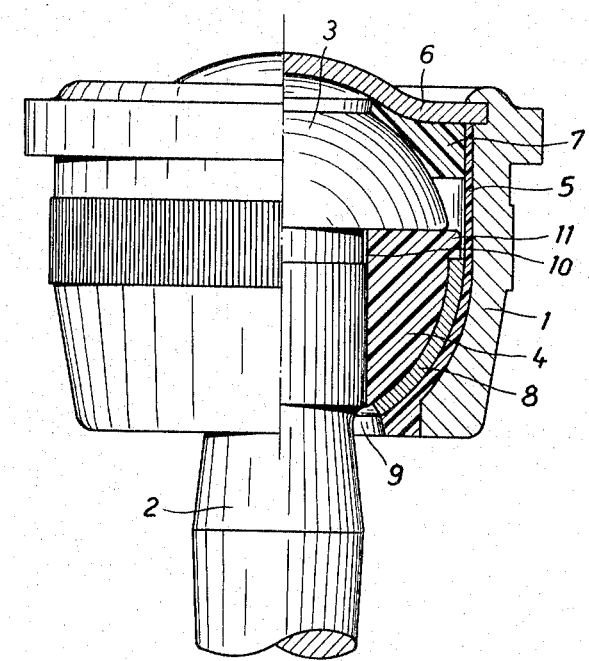
Inventor
RUDOLF GOTTSCHALD
Kenyon & Kenyon
ATTORNEYS

United States Patent Office 3,363,921
Patented Jan. 16, 1968

3,363,921
UNIVERSAL JOINTS, ESPECIALLY FOR MOTOR VEHICLES
Rudolf Gottschald, Osterath, Germany, assignor to A. Ehrenreich & Cie, Dusseldorf-Oberkassel, Germany
Filed June 22, 1965, Ser. No. 465,971
Claims priority, application Germany, July 16, 1964, E 20,241
1 Claim. (Cl. 287—90)

ABSTRACT OF THE DISCLOSURE

The subject invention relates to universal joints of the ball and socket type. More particularly, a pin, terminating in a hemispherical collar adapted to cooperate with a substantially hemispherical section of plastic material to form the joint ball section, is mounted thereby in a housing for universal movement. In addition, the housing is provided with an internal lining of plastic material while a sheet metal covering conforming to the contour of the plastic section of the ball is fixedly arranged thereon to bear against the plastic lining thereby effecting a metal to plastic bearing relaionship.

---

The invention relates to a universal or ball-and-socket joint, especially for motor vehicles, which consists of a housing and a pin passing through an opening in the housing and provided with a ball-shaped head accommodated in said housing, said head being formed partly by a collar with rounded surface formed on said pin and partly by a section of a ball of synthetic substance, preferably acetal resin, supplementing the rounded surface to form a spherical head.

In the case of so-called hanging universal joints, the ball pin is subjected to a tensional load, that is, the vertical force produced by the weight of the vehicle acts in the direction towards the bearing surface of the housing on the side where the pin passes out therefrom. This bearing surface for the spherical head is formed by a hollow spherical or cup-shaped surface substantially the size of a hemisphere less the area of the opening for the hinge pin. Owing to the structural dimensions of such universal joints serving as wheel joints being restricted by the spatial conditions at the place where they are fitted, the specific surface pressure between the plastic ball head on this side and the only relatively small bearing surface in the housing is very heavy. As a result the construction of such universal joints presents difficulties.

The hollow spherical surface serving as bearing in the housing demands particularly careful working to ensure sufficient accuracy, because the plastic ball section wears very quickly, the wear being particularly great at the edges of the opening in the housing.

The invention is based substantially on the problem of improving the universal joints of the type mentioned and in particular overcoming the above-mentioned difficulties as well as reducing the wear.

To solve this problem, the invention proposes to provide a bearing surface of plastic material for the ball head in the interior of the housing and a surface of steel on the ball head bearing against this surface.

For this purpose, the bearing surface in the housing for the plastic portion of the ball is, according to the invention, formed by a plastic lining in the housing and at least the surface of the plastic ball section which bears against this plastic bearing lining by a sheet metal covering.

In this manner, the accurate internal machining which was hitherto essential for hanging joints and very difficult and expensive to carry out, can be dispensed with and at the same time it is no longer necessary to provide a ball section of steel as normally required with the desired pairing of a steel running surface and a plastic running surface or contacting surfaces of steel and plastic moving in relation to each other can easily be produced, for example by injection casting, without any additional machining or finishing work being required. The ball section receives a covering in the form of a sheet metal dish, for example sheet steel.

An embodiment of the invention is illustrated by way of example in the only figure of the accompanying drawing which shows a universal or ball-and-socket joint, partly in vertical section.

The housing of the universal joint is designated by 1. In this housing the ball-shaped head of a pin 2 is mounted, which pin passes through an opening 9 in the housing. The ball head is composed of a collar 3 with a spherically rounded outer surface. Coordinated thereto is a ball section 4 of the acetal resin which supplements the collar 3 to form the ball head. The pin 2 is threaded through a central passage 10 in the ball section and its flat shoulder bears against the flat surface of the ball section.

In the housing, the bearing surface for the ball section is formed by a lining 5 of plastic material. This lining is secured in the housing by a cover 6 on the housing.

Between the rounded outer surface of the pin collar 3 and the cover 6 of the housing there is an elastic intermediate layer 7 or a spring element which holds the ball head in the housing without play.

The ball section 4 of acetal resin is equipped with a sheet metal covering 8 in the form of a dish with which the ball section 4 bears against the plastic lining 5 so that during the movements of the ball section, a steel surface slides on a plastic surface. The edge 11 of the ball section engages over the edge of the sheet metal covering 8 without however extending up to the lining 5 of plastic material.

What I claim is:
1. A ball and socket type universal joint having a casing with an opening at one end, a pin terminating in an enlarged journal head portion with segmental spherical surface, an annular hemispherical plastic section which has an axial passage therethrough surrounding the pin and engaging and cooperating with the journal head portion to form the joint ball member, an annular cup-like sheet metal cover recessed within the spherical surface of said plastic section and contiguous with the surface of the hemispherical plastic section of the ball wherein the ball member is universally mounted in the casing with the pin extending through the casing opening,
    a plastic lining fixedly arranged on the interior wall of the casing and extending axially from the top of the casing to the casing opening and protruding thereinto, said liner uniformly increasing in thickness from the top of said casing to said opening.

References Cited
UNITED STATES PATENTS

| 2,779,603 | 1/1957 | McRae | 287—90 |
| 2,937,895 | 5/1960 | Langen et al. | 287—87 |
| 3,041,094 | 6/1962 | Herbenar | 287—87 |
| 3,091,486 | 5/1963 | Baker | 287—87 |
| 3,149,863 | 9/1964 | Melton et al. | 287—90 |

FOREIGN PATENTS
1,156,017    12/1957    France.

CARL W. TOMLIN, Primary Examiner.
EDWARD C. ALLEN, Examiner.
A. V. KUNDRAT, Assistant Examiner.